United States Patent [19]
Carlson et al.

[11] Patent Number: 5,237,753
[45] Date of Patent: Aug. 24, 1993

[54] CAPACITIVE GRAVITY SENSOR AND INCLINOMETER

[75] Inventors: Bradley D. Carlson, Glendale; Harold L. Swartz, Phoenix; Warren W. Stansberry, Peoria, all of Ariz.

[73] Assignee: Lucas Sensing Systems, Inc., Phoenix, Ariz.

[21] Appl. No.: 884,332

[22] Filed: May 18, 1992

[51] Int. Cl.$^5$ .............................................. G01C 9/06
[52] U.S. Cl. ...................................... 33/366; 340/689
[58] Field of Search ......................... 33/366; 340/689; 361/280, 522; 364/539

[56] References Cited
U.S. PATENT DOCUMENTS
4,644,662  2/1987  Anderson et al. ................... 33/366

FOREIGN PATENT DOCUMENTS
87/04515  7/1987  World Int. Prop. O. ............ 33/366

Primary Examiner—Thomas B. Will
Attorney, Agent, or Firm—Nixon & Vanderhye

[57] ABSTRACT

Disclosed is an improved inclination sensor and an improved inclinometer. A pair of plates in combination with a metallic housing provides accurate inclination information over ranges of 0°±60° and 180°±60°. A second pair of plates rotated 90° in the plane of the first pair of plates, provides accurate inclination information over ranges of 90°±60° to 270°±60°. Coverage is thereby provided over 360°. The inclination sensor is combined with a microprocessor which is programmed to weight the contribution of the plates so as to provide a smooth transition for angles in the region of coverage overlap. A EEPROM memory stores and provides calibration input information to correct the inclination sensor output to accurate output angles.

8 Claims, 3 Drawing Sheets

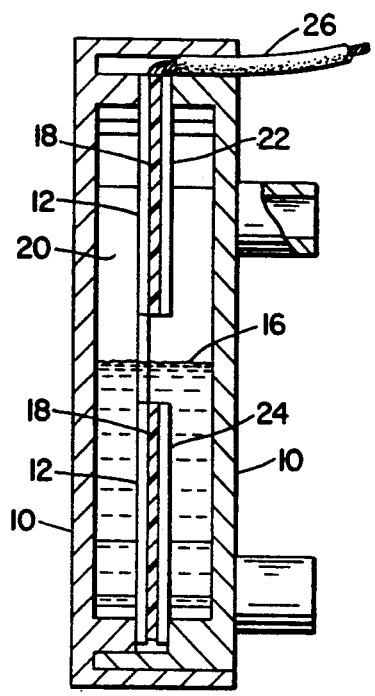
*Fig.5*
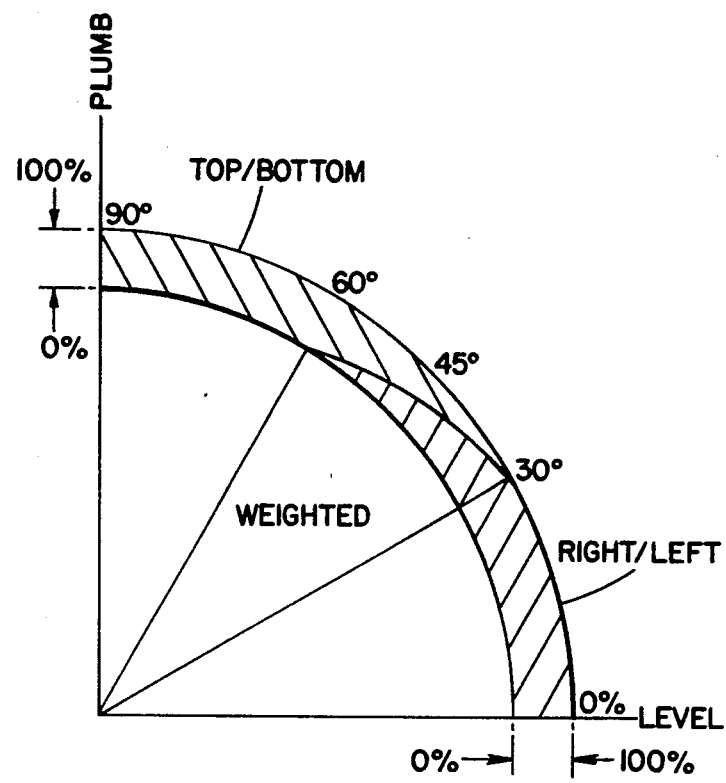
*Fig.6*
*Fig.7*
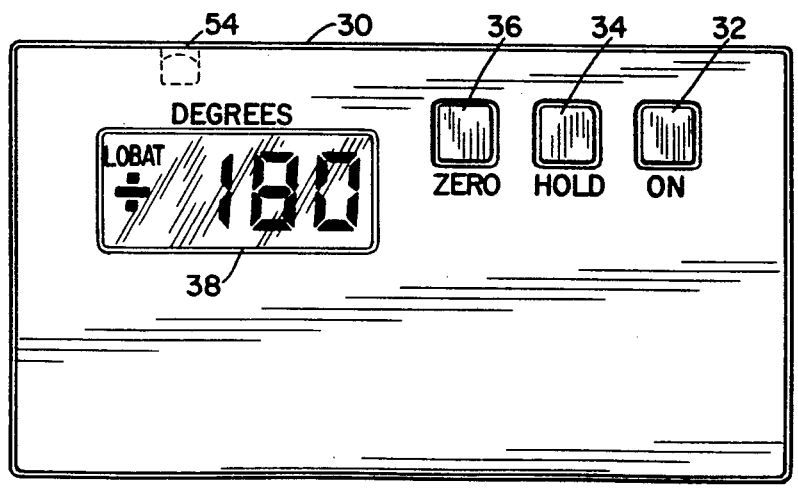

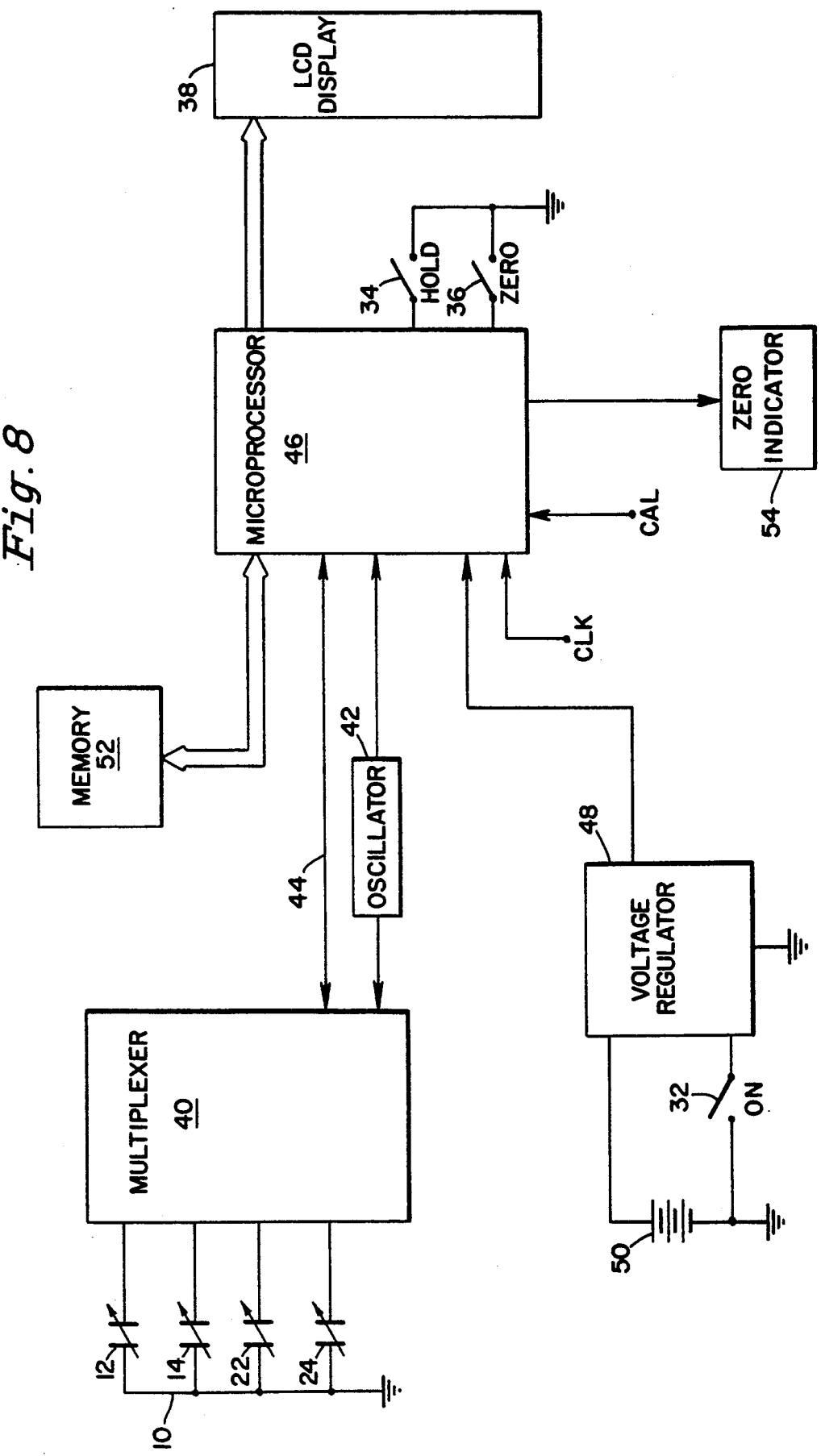

CAPACITIVE GRAVITY SENSOR AND INCLINOMETER

BACKGROUND OF THE INVENTION

1. Field of the Invention

The invention relates to inclination sensing instruments and more particularly to an instrument that utilizes variable capacitance as a function of inclination angle over all inclination angles.

2. Description of the Prior Art

Capacitive gravity sensors are well known and a particularly effective embodiment is discussed in U.S. Pat. No. 4,644,662 issued to Anderson et al on Feb. 24, 1987. FIGS. 1A and 1B illustrate the capacitive gravity sensor as taught in '662 patent. The gravity sensor includes a housing 10, a pair of capacitive plates including left plate 12 and right plate 14. The plates are at least partially immersed in a dielectric fluid 16.

In FIG. 1A the '662 inclination sensor is inclined at an angle $\phi$. Details of a modification of the '662 sensor are shown in cross-sectional view at FIG. 1B where it can be seen that there are two left plates 12 separated by a dielectric board 18. In a preferred embodiment, this is a printed circuit board and has the electrically decoupled plates etched on both sides and is then covered with a TEFLON plastic or other insulative coating 15. The dielectric fluid 16 only partially fills the chamber formed by the housing 10 leaving a space thereabove which may be filled with a nitrogen gas 20. It should be noted that the two left plates are connected together and the two right plates are connected together, although the left and right pairs of plates are not connected together.

It will be seen that each plate with respect to the metallic housing 10 comprises a capacitor whose capacitance varies depending upon the amount of fluid in between the plates. The plates shown in FIG. 1A can also be seen from the front in FIG. 2A and from the rear in FIG. 2B. The fact that the two right plates are coupled together merely serves to increase the capacitance of the right plates and the same is true for the left plates.

The device shown in FIGS. 1A, 1B, 2A and 2B will provide accurate inclination information up to angles in the vicinity of 60° to 70°. As can be seen in FIG. 1A at angle $\phi$, the left plates are significantly more immersed in the dielectric fluid than are the right plates. Therefore, the capacitance between the left plates and the metal housing is increased and the capacitance between the right plates 14 and the metal housing 10 is decreased. This differential in capacitance can be measured and provides an electrical indication of the inclination of the sensor. This is discussed in the '662 patent and a suitable circuit for utilizing variable capacitance is discussed in U.S. Pat. No. 4,642,555 issued to Swartz et al on Feb. 10, 1987. The subject matter of U.S. Pat. Nos. 4,644,662 and 4,642,555 are herein incorporated by reference.

A problem with the above prior art inclination inclination angles of between ±60°-70°. This is apparent because it is at this point that one set of plates is completely immersed and the other set of plates is completely out of the dielectric fluid. Therefore, increases in angle do not result in a measurably increased capacitance on one side or a concurrent reduction in capacitance on the other side.

SUMMARY OF THE INVENTION

In view of the above, it is an object of the present invention to provide an improved capacitive gravity sensor with a range of 360°.

It is a further object of the present invention to provide an improved inclinometer utilizing a capacitive gravity sensor and a microprocessor to select the appropriate plates for indicating inclination where the selection is dependent upon the inclination.

It is a further object of the present invention to provide an inclinometer using an improved capacitive gravity sensor and a microprocessor where the microprocessor includes a calibration memory so as to provide a highly accurate inclination output.

It is a still further object of the present invention to utilize an improved capacitive gravity sensor and a microprocessor for implementing desired plates and implementing a weighting formula by which the effects of different plates are combined to provide a highly accurate output indication of inclination.

The above and other objects are achieved in accordance with the present invention in which on one side of the capacitive gravity sensor, left and right plates are utilized as in prior art inclinometers. However, on the other side, instead of left and right plates, top and bottom plates are utilized. The top and bottom plates are not interconnected with the right and left plates and instead all four plates in combination with the metallic housing form four separate variable capacitors. The left and right plates provide inclination angle information over the range 0°±60° and 180°±60° and the top and bottom plates provide inclination angle information over the range 90°±60° and 270°±60°. Where the left/right and top/bottom plates provide overlapping coverage, a weighting formula permits a smooth transition between coverage.

In a preferred embodiment, the inclination sensor is utilized with a microprocessor for implementation of the weighting formula. Additionally, a memory serves to store correction factors so the actual output of the variable capacitors is corrected to indicate the actual inclination.

BRIEF DESCRIPTION OF THE DRAWINGS

FIG. 5 is a side cross-sectional view of an inclination sensor in accordance with the present invention;

FIG. 6 is a graph showing the weighting of inclination angle information from the right/left and top/bottom pairs of capacitor plates;

FIG. 7 is a front view of an inclinometer in accordance with the present invention; and FIG. 8 is an electrical block diagram of the interconnection of the capacitor plates with the microprocessor and other components of the sensor.

DETAILED DESCRIPTION OF PREFERRED EMBODIMENTS

Figure 2A:
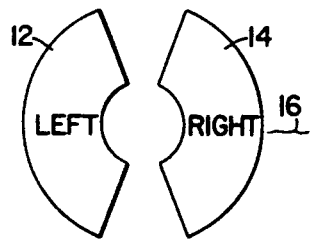
FIGS. 2A and 2B are front and rear views of capacitor plates in a prior art inclination sensor.
Figure 2B:
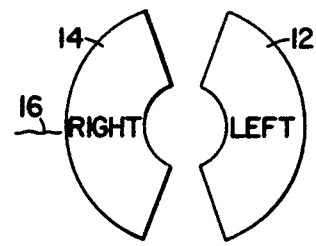
Figure 3A:
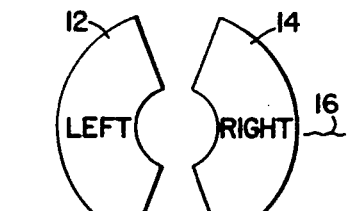
FIGS. 3A and 3B are front and rear views of capacitor plates in the present invention.

The details of the present invention will be more clearly understood by reference to FIGS. 3A through 8 wherein like reference numerals indicate similar structures in the several views. The left and right plates, as shown in FIG. 3A, are similar to those in '662 patent and illustrated in FIG. 2A. However, on the other side of dielectric board 18, top plate 22 and bottom plate 24 are disposed as shown in FIG. 3B.

Figure 3B:
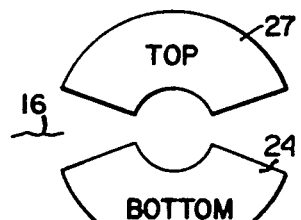

FIGS. 3A and 3B illustrate the position of the plates when the inclination angle $\phi$ is zero. In this position, the left and right plates would be utilized to provide an equal capacitance and would be sensed by the appropriate capacitance sensing network (for example, that discussed in the '555 patent) and would be capable of providing accurate inclination information up to $\pm(60°$ to $70°)$. The top and bottom plates, since the bottom plate is fully immersed and the top plate is completely out of the dielectric fluid, would not be utilized to provide any inclination information as it would not provide an output which would vary with slight changes in inclinations.

Figure 4A:
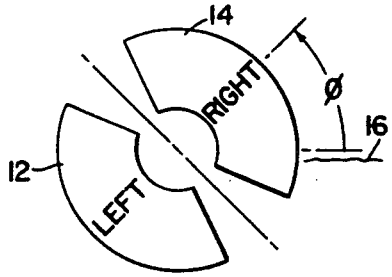
FIGS. 4A and 4B are front and rear views of capacitor plates in the present invention inclined at approximately 45°.
Figure 4B:
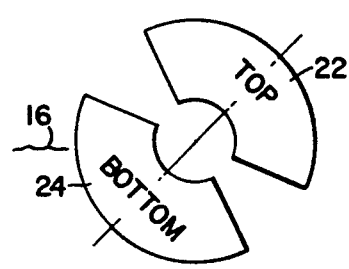

However, as shown in FIG. 4A and 4B, with an inclination angle $\phi$ equal to approximately 45°, both the left and right plates provide a capacitive output and the top and bottom plates also provide a capacitive output. The manner in which these capacitive outputs are weighted and processed will be discussed later. It can be seen that as the inclination angle $\phi$ increases towards 90° the top/bottom pair of plates would continue to be effective although the left/right plates would cease to provide an accurate signal.

Figure 1A:
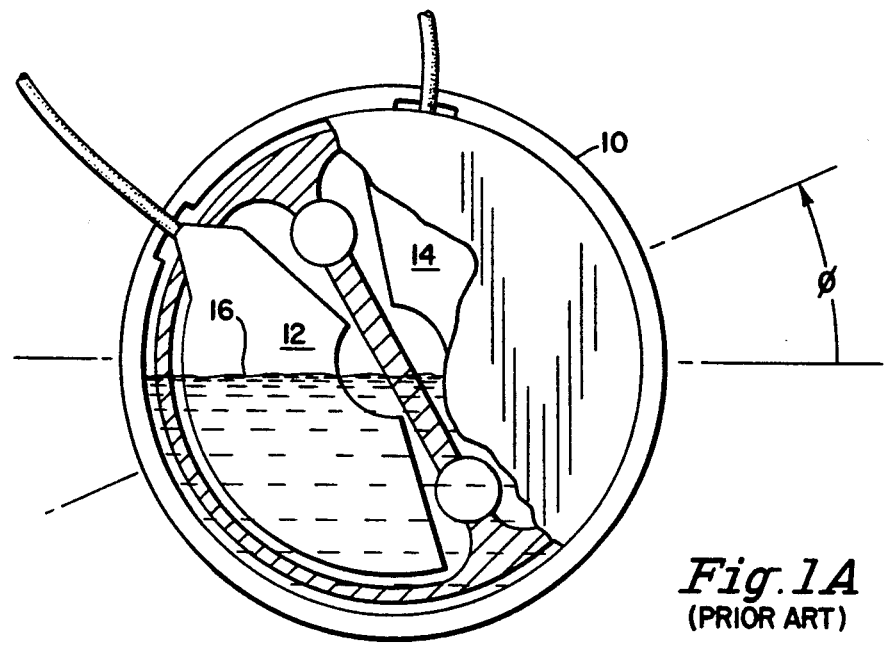
FIG. 1A is a partial cut away view of a prior art inclination sensor.
Figure 1B:
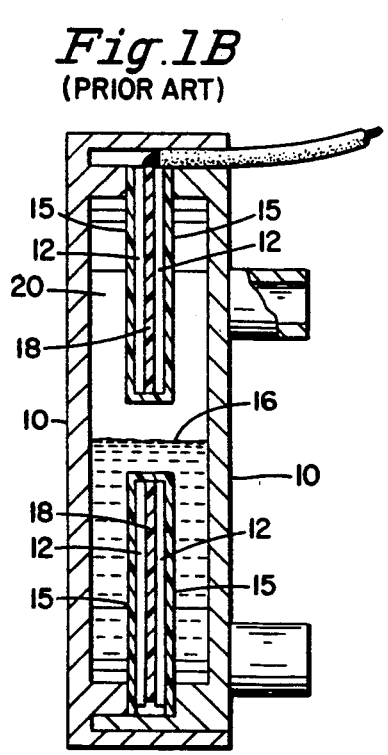
FIG. 1B is a side cross-sectional view of a prior art inclination sensor similar to that shown in FIG. 1A.

FIG. 5 illustrates a view of the improved capacitive gravity sensor showing the similarities to that of the '662 which was illustrated in FIG. 1B. A similar metallic housing 10, forming a common capacitor plate, is utilized as well as similar left plate 12 and right plate (not shown). However, on the right side of dielectric board 18, the two separate plates, top plate 22 and bottom plate 24, can be seen. Output cable 26 provides the output for left plate 12 and there are similar cables for top plate 22, right plate 14 and bottom plate 24 (not shown). In a preferred embodiment, the housing pressing against a teflon sheet provides a seal so as to prevent leakage of nitrogen gas 20 or dielectric fluid 16 (see U.S. Pat. No. 4,637,617 to Stansberry et al).

Because both sets of plates provide an accurate output signal at 45°, the manner in which the capacitive plate's signals are combined is illustrated in FIG. 6. The figure is a graph extending from level ($\phi$ equal to 0°) to vertical ($\phi$ equals 90°). The width of the arc, extending from 0% to 100%, indicates the contribution of the indicated plates reading to the arc being shaded to indicate the contribution of the right/left pair of plates and the upper portion of the arc indicating the contribution from the top/bottom pair of plates.

As can be seen in FIG. 6, in the quadrant having an inclination angle from 0° to 30°, the sole capacitance output utilized in determining inclination is the right and left pair of plates (where the accurate $+60°$ range of inclination angles is centered about $\alpha=30°$). However, it will be recalled that when these plates in the prior art inclination sensor (U.S. Pat. No. 4,644,662) reach about 60°, they begin to be inaccurate due to one plate being completely immersed in dielectric fluid and/or the other plate being completely free of the dielectric fluid. Consequently, it would be desirable not to rely upon the right/left pair of plates at inclination angles beyond 60°. Therefore, at 30° the output inclination angle begins to utilize a contribution from the top/bottom pair of plates (where the accurate $+60°$ range of inclination angles is centered about $\beta=60°$).

As can be seen in FIGS. 4A and 4B at approximately 45° inclination angle, the left plate 12 and the bottom plate 24 are equally immersed to a greater extent and right plate 14 and top plate 22 are equally immersed to a lesser extent. Both plates would deliver a similar highly accurate inclination angle indication. The sensor, as implemented by the microprocessor, utilizes half of the output provided by the right/left pair and half of the output provided by the top/bottom pair.

As the inclination angle increases, less and less of the right/left pair signal is used and more and more of the top/bottom pair signal is used. Finally, at 60° inclination angle, no further contribution of the right/left pair of plates is utilized and the only contribution is the top/bottom pair of plates. Of course, this arc also would extend to all other inclination angles as well with similar weighted contributions between the top/bottom pair of plates and the right/left pair of plates between 120° to 150°, between 210° and 240° and between 300° and 330°.

The "weighting" in the inclination angle overlap region of between 30° and 60° serves to provide a smooth transition between the right/left pair of plates and the top/bottom pair of plates which not only makes for a more accurate inclination angle measurement, but also provides smooth operation of the device on either side of 45°. Without such a weighting, it is entirely possible that the capacitance could jump dramatically between $44\frac{1}{2}°$ and $45\frac{1}{2}°$ as the inclinometer shifts from one set of plates to the other set of plates. The present invention allows for a smooth transition between the two sets of plates.

Thus, in accordance with the above, the present capacitive gravity sensor can provide capacitive output information around a full 360° arc without discontinuities between switch over points for one set of plates to another set of plates.

The physical layout of applicant's improved inclinometer is shown in FIG. 7 which has the inclinometer sensor enclosed within an external casing 30 which includes "ON" switch 32, "HOLD" switch 34 and "ZERO" switch 36. A conventional liquid crystal display panel 38 provides the output indication of the inclination angle of the inclinometer. A low battery indicator (LOBAT) will indicate the status of the battery powering the device. A detailed discussion of the electronic signal processing will be more clearly understood by reference to FIG. 8.

In FIG. 8, the four variable capacitors (formed between the common plate 10 and plates 12, 14, 22 and 24) are input to multiplexer 40 which serves to pass the variable capacitance sequentially through an astable oscillator 42. The oscillator 42, in combination with the capacitance sensed from the variable capacitors, permits multiplexer 40 to provide along line 44 an electrical indication of inclination sensed by each of the four capacitors to the microprocessor 46. The microprocessor 46, in a preferred embodiment, is an Intel 8051 microprocessor. A further input to the microprocessor is a clock input which, in a preferred embodiment, is a crystal oscillator operating at 11.852 Mhz.

The voltage regulator, when "ON" button 32 is depressed, supplies regulated supply voltage to microprocessor 46, multiplexer 40 and other blocks as necessary (power supply interconnections other than with microprocessor 46 have been eliminated for purposes of clarity). The depression of "ON" button 32 causes the voltage regulator 48 to latch in an "on" condition for a predetermined period of time after which it reverts to its "off" configuration. In a preferred embodiment, the battery 50 is a conventional 9 volt DC battery. It should also be noted that while the ground connection of housing 10, battery 50, voltage regulator 48, "HOLD" switch 34 and "ZERO" switch 36 have been shown, other ground connections associated with the oscillator 42 and the other circuit elements have been omitted for purposes of clarity.

Memory 52, which in a preferred embodiment, is an Electrically Erasable Programmable Read Only Memory (EEPROM) serves to "remember" the inclination signals needed for given angles being measured during a calibration operation. Upon supplying a specific voltage to the "cal" input to microprocessor 46, memory 52 records the actual inclination signal present when the sensor is at a predetermined series of angles which in a preferred embodiment would be 0°, 45°, 90°, 135°, 180°, 225°, 270°, and 315°. Thusly calibrated, the microprocessor can then accommodate for slight differences in the manufacturing of the right/left and top/bottom plates to insure that, at those specific angles, the indicated angle is the same as the actual angle. The microprocessor will also interpolate between these preset angles to provide any necessary error correction for angles other than at these 45° angles.

"HOLD" switch 34, when depressed, will retain the current reading on LCD display 38. This permits utilization of the inclinometer in positions where the display cannot be immediately read and permits the inclination to be retained for subsequent reading. Depression of the "ZERO" switch, adjusts the calibration to 0°, although it does not change the calibration or characterization information contained in EEPROM memory 52. The zero merely sets the display to 0° when the inclinometer is set at any angle and all remaining angles will be measured from that angle.

A zero indicator serves to provide a visual output indication when 0° has been reached. In one embodiment the indicator can be a light emitting diode 54 (recessed into the case as shown in FIG. 7, and will provide a visual indication that 0° has been reached.

The actual programming of microprocessor 46 is not particularly critical and could be accomplished by person of ordinary skill in the art given the above information. By reference to FIGS. 4A and 4B, because the left plate 12 and the bottom plate 24 both have substantially higher capacitances than do right plate 14 and top plate 24, the comparison of all four capacitances will clearly suggest that the inclination angle $\phi$ is 45° rather than 135°, 225° or 315°. Thus, by comparison of the four capacitances measured, the microprocessor can tell in which quadrant the tilt angle being measured is located and provide an indication of the angle from 0° to 360° (or ±180°).

While the plates are generally configured to provide a linear change in output as inclination angle changes, different plate shapes will provide different outputs for example sine and tangent functions. Different shapes having greater or lesser linearity (with the change in inclination angle) could then be accommodated for in the microprocessor 46. Linearity errors could also be corrected for by changing the shape of the plates as well. Although two left/right plates are horizontally separated by a distance and the two top/bottom plates are vertically separated by a distance, additional plates could be utilized, although this would provide additional complexity for the microprocessor.

Moreover, as few as three plates (along with a common plate) could be utilized (as opposed to the presently disclosed two pairs of plates and one common, for a total of five), although the angles over which the various plates capacitance is sampled would change. It is possible that with three plates and a common plate, the capacitance of all three plates would be sampled and then weighted appropriately depending upon the angle being measured. However, a change in the temperature would change the fluid height (due to expansion) causing errors when fewer than four plates (plus a common plate) are used.

While a multiplexer is utilized to economize on processing circuitry for each of the variable capacitors formed by the plates, multiple signal processors could be utilized. Use of memory 52 is advantageous in maintaining extremely high accuracies, but may be deleted in some low cost applications. Similarly, the momentary "ON" switch, coupled with the voltage regulator 48 internal circuitry which holds the microprocessor on for a preset period of time, could be dispensed with and a simple manual on/off switch could be employed. While the visual indication of the level of the inclinometer is provided with conventional LCD display 38, other digital or analog output display devices could be utilized.

While the housing 10, in a preferred embodiment, is of metallic construction and is utilized as the common plate, a plastic housing with a common plate (formed by etched cladding on the plastic, by vapor deposition, by conductive plastic for by adding carbon or silver) or any other suitable structure) could also be used. Additionally, while the present preferred embodiment illustrates that the housing is essentially half full of dielectric fluid, more or less fluid could be utilized. The variation in fluid would change the relative change in capacitance as the inclinometer is moved through various inclinations.

It is noted that in the preferred embodiment, while the left and right plates and the top and bottom plates are essentially symmetrical and would have similar ranges of accurate measurement ($\theta_1 = \theta_2 = \pm 60° = 120°$) one set of plates, for example the left and right plates, could have a range $\theta_1$ closer to a 180° arc of coverage with the other set, the top and bottom plates, having a range $\theta_2$ of closer to 0°. In fact, the left and right plates could be different geometrical shape as could the top and bottom plates.

Therefore, even though the accurate range $\theta_1$ and $\theta_2$ of inclination angles to be measured by the left and right plates may differ from that to be measured by the top and bottom plates, respectively, the combination of the two ranges of inclination ($\theta_1 + \theta_2$) must be greater than 180°. It can be seen that this is necessary so that the device can accurately measure 180° in the plus direction or in the minus direction (for a full 360°).

As shown in FIGS. 3A and 3B, the left and right plates have a range of inclination angles equal to approximately 120° (±60°). The top and bottom plates have a similar range of inclination angles. In this preferred embodiment, the top and bottom plates are oriented orthogonally with respect to the left and right plates so that, as shown in FIG. 6, their ranges of inclination angles overlap by 30°. It is in this overlap region that the microprocessor implements a "weighting" factor between the outputs from the two sets of capacitors.

Although both sets of capacitors will give relatively accurate readings in this overlap region (because it is still within the ±60° range of weights the totals (in the interval 30°≦φ60°), depending upon whether the circuit errors are generated as multiplier errors or summing errors, as follows:

Reading (for reduction of multiplier errors) =

$$\left[(\text{left}/(\text{left} + \text{right})) \times \left(\frac{60 - \phi}{30}\right)\right] +$$

$$\left[(\text{top}/(\text{top} + \text{bottom})) \times \left(\frac{\phi - 30}{30}\right)\right]$$

Reading (for reduction of summing errors) =

$$\left[(\text{left} - \text{right}) \times \left(\frac{60 - \phi}{30}\right)\right] +$$

$$\left[(\text{top} - \text{bottom}) \times \left(\frac{\phi - 30}{30}\right)\right]$$

While the reduction of summing errors is preferred, there may be circumstances in which a reduction of multiplier errors may be preferable. It can be seen that the above formula will transition smoothly between readings made by the right/left pair of plates and the readings made by the top/bottom pair of plates as the inclination angle moves between 30° and 60° (the same is true of the other three quadrants as well).

In accordance with the above, many modifications and derivations of the above disclosed improved inclinometer including the improved inclinometer sensor will be obvious to one of ordinary skill in the art. The present invention is not limited by the examples disclosed in this application and are limited only by the claims appended hereto.

What is claimed is:

1. An inclinometer sensor capable of providing an electrically measurable indication of inclination angles of from 0° to ±90° from a given reference angle $\alpha$, said inclinometer sensor comprising:

means defining at least one fluid container;

a fluid having a dielectric constant at least partially and not completely filling said at least one container;

first and second pairs of plates, said plates located with at least a portion of said fluid affecting capacitance between respective plates of each of said first and second pairs of plates;

third and fourth pairs of plates, said plates located with at least a portion of said fluid affecting capacitance between respective plates of each of said third and fourth pairs of plates;

said first and second pairs of plates and said fluid comprising a means for varying capacitance between respective plates of each of said first and second pairs of plates over a $\theta_1$ range of inclination angles centered about $\alpha$; and said third and fourth pairs of plates and said fluid comprising a means for varying capacitance between respective plates of each of said third and fourth pairs of plates over a $\theta_2$ range of inclination angles centered about $\beta$, where $\beta$ is offset from $\alpha$ and $\theta_1 + \theta_2$ is greater than 180°.

2. The sensor according to claim 1, wherein there is further included:

a microprocessor, said microprocessor comprising a means for measuring capacitance of said first, second, third and fourth pairs of plates and for computing said inclination angle; and display means, responsive to said microprocessor, for visually displaying said inclination angle.

3. An inclinometer sensor capable of providing an electrically measurable indication of inclination angles of from 0° to 360° from a given reference angle $\alpha$, said inclinometer sensor comprising:

means defining at least one fluid container;

a fluid having a dielectric constant at least partially and not completely filling said at least one container;

first and second pairs of plates, said plates located with at least a portion of said fluid affecting capacitance between respective plates of each of said first and second pairs of plates;

third and fourth pairs of plates, said plates located with at least a portion of said fluid affecting capacitance between respective plates of each of said third and fourth pairs of plates;

said first and second pairs of plates and said fluid comprising a means for varying capacitance between respective plates of each of said first and second pairs of plates over a $\theta_1$ range of inclination angles centered about both $\alpha$ and $\alpha + 180°$; and said third and fourth pairs of plates and said fluid comprising a means for varying capacitance between respective plates of each of said third and fourth pairs of plates over a $\theta_2$ range of inclination angles centered about both $\beta$ and $\beta + 180°$, where $\beta$ is offset from $\alpha$ and $\theta_1 + \theta_2$ is greater than 180°.

4. The sensor according to claim 3, wherein $\theta_1$ and $\theta_2$ are each greater than 90°.

5. The sensor according to claim 3, wherein $\alpha$ is substantially 0° and $\beta$ is substantially 90°.

6. The sensor according to claim 3, wherein one plate of said first pair of plates is common with one plate of said second pair of plates, and one plate of said third pair of plates is common with one plate of said fourth pair of plates.

7. The sensor according to claim 3, wherein one plate of said first pair of plates, one plate of said second pair of plates, one plate of said third pair of plates and one plate of said fourth pair of plates is common.

8. The sensor according to claim 3, wherein there is further included:

a microprocessor, said microprocessor comprising a means for measuring capacitance of said first, second, third and fourth pairs of plates and for computing said inclination angle; and display means, responsive to said microprocessor, for visually displaying said inclination angle.

* * * * *